United States Patent
Yoon (10) Patent No.: US 9,515,784 B2
(45) Date of Patent: Dec. 6, 2016

(54) APPARATUS AND METHOD FOR RETRANSMITTING DATA IN WIRELESS COMMUNICATION SYSTEM

(71) Applicant: Samsung Electronics Co., Ltd, Gyeonggi-do (KR)

(72) Inventor: Su-Ha Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 109 days.

(21) Appl. No.: 13/886,136

(22) Filed: May 2, 2013

(65) Prior Publication Data

US 2013/0294223 A1  Nov. 7, 2013

(30) Foreign Application Priority Data

May 2, 2012  (KR) ................ 10-2012-0046294

(51) Int. Cl.
*H04L 1/18* (2006.01)
*H04L 1/06* (2006.01)

(52) U.S. Cl.
CPC .............. *H04L 1/1893* (2013.01); *H04L 1/06* (2013.01)

(58) Field of Classification Search
CPC .................................................. H04L 12/2863
See application file for complete search history.

(56) References Cited

U.S. PATENT DOCUMENTS

| | | | |
|---|---|---|---|
| 2003/0016697 A1* | 1/2003 | Jordan | 370/466 |
| 2006/0028991 A1* | 2/2006 | Tan et al. | 370/237 |
| 2006/0126660 A1* | 6/2006 | Denney et al. | 370/468 |
| 2007/0097907 A1* | 5/2007 | Cummings | 370/329 |
| 2009/0041015 A1* | 2/2009 | Zhang | 370/392 |
| 2009/0274131 A1* | 11/2009 | Lee et al. | 370/338 |
| 2009/0323610 A1* | 12/2009 | Gaddam et al. | 370/329 |
| 2010/0020684 A1* | 1/2010 | Balakrishnan et al. | 370/230 |
| 2010/0061234 A1* | 3/2010 | Pai et al. | 370/230.1 |
| 2010/0226319 A1* | 9/2010 | Hasegawa | 370/329 |
| 2011/0213877 A1* | 9/2011 | Plummer et al. | 709/224 |
| 2012/0039173 A1* | 2/2012 | Danzig et al. | 370/235.1 |
| 2012/0039284 A1* | 2/2012 | Barbieri et al. | 370/329 |
| 2012/0051294 A1* | 3/2012 | Guillouard | 370/329 |
| 2012/0147751 A1* | 6/2012 | Ulm | 370/237 |
| 2012/0307804 A1* | 12/2012 | Gorsuch et al. | 370/335 |
| 2013/0201861 A1* | 8/2013 | Wang et al. | 370/252 |
| 2013/0235731 A1* | 9/2013 | Hadinata | H04L 65/1083 370/241 |
| 2013/0239150 A1* | 9/2013 | Chen et al. | 725/62 |
| 2014/0079016 A1* | 3/2014 | Dai et al. | 370/330 |

FOREIGN PATENT DOCUMENTS

KR   10-2009-0114806   11/2009

* cited by examiner

*Primary Examiner* — Phirin Sam
*Assistant Examiner* — Tarell Hampton (57) ABSTRACT

An apparatus and a method for retransmitting data in a wireless communication system using channel bonding are provided. The method for retransmitting data includes transmitting data by mapping the data to at least two channels according to the channel bonding, and retransmitting the data by changing a mapping scheme of the data to the at least two channels.

21 Claims, 6 Drawing Sheets

APPARATUS AND METHOD FOR RETRANSMITTING DATA IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on May 2, 2012; and assigned Serial No. 10-2012-0046294, the entire disclosure of which is hereby incorporated by reference.

TECHNICAL FIELD

The present invention relates generally to a wireless communication system. More particularly, the present invention relates to an apparatus and a method for retransmitting data in a wireless communication system using multichannel.

BACKGROUND

A Wireless Local Area Network (WLAN) is a communication scheme for providing a LAN service using radio resources. In this case, a wireless communication system divides a bandwidth available for the communication service into a plurality of channel. For example, the wireless communication system can use 13 channels in the bandwidth of 2.4 GHz and 19 channels in the bandwidth of 5 GHz.

To enhance a signaling speed, the WLAN can adopt a channel bonding technique for providing the communication service using a plurality of non-overlapping channels. For example, according to Institute of Electrical and Electronics Engineers (IEEE) 802.11n standard, the WLAN can raise a maximum transmission rate up to 600 Mbps using the non-overlapping channels at the same time.

When the channel bonding is applied as discussed above, a transmitting stage can send a packet using the non-overlapping channels. When the packet transmitted to a receiving stage is compromised, the transmitting stage retransmits the corresponding packet using the same channel as the original packet. However, since a radio channel of the WLAN is quasi-static based on time resources, the retransmitted packet is subject to the error similar to the original packet. Further, using the channel bonding, the wireless communication system is more vulnerable to a hidden node problem and thus the error probability of the retransmitted packet may increase.

SUMMARY

To address the above-discussed deficiencies of the prior art, it is a primary aspect of the present disclosure to provide an apparatus and a method for retransmitting data in a wireless communication system using multichannel.

Another aspect of the present disclosure is to provide an apparatus and a method for retransmitting data in a wireless communication system using channel bonding.

Yet another aspect of the present disclosure is to provide an apparatus and a method for retransmitting data using a different channel from original data in a wireless communication system adopting channel bonding.

Still another aspect of the present disclosure is to provide an apparatus and a method for determining a channel to retransmit data by considering channel status information in a wireless communication system using channel bonding.

According to one aspect of the present disclosure, a method for retransmitting data in a wireless communication system using channel bonding includes transmitting data by mapping the data to at least two channels according to the channel bonding; and retransmitting the data by changing a mapping scheme of the data to the at least two channels.

According to another aspect of the present disclosure, a wireless device includes a controller configured to transmit data by mapping the data to at least two channels according to a channel bonding, and to retransmit the data by changing a mapping scheme of the data to the at least two channels; and a transmitter configured to transmit or retransmit the data under control of the controller.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a technique for retransmitting data in a wireless communication system using channel bonding.

Hereinafter, it is assumed that the wireless communication system supports the channel bonding using a Wireless Local Area Network (WLAN) communication method using multichannel. Still, the wireless communication system can retransmit data in the same manner as the channel bonding, using other communication scheme with the multichannel. Hereafter, the wireless communication system using the WLAN communication can be referred to as a WLAN system.

Hereinafter, a wireless device can embrace devices for providing a WLAN service, such as portable electronic device, portable terminal, mobile terminal, mobile pad, media player, Personal Digital Assistant (PDA), laptop computer, smart phone, netbook, television, Mobile Internet Device (MID), Ultra Mobile Personal Computer (UMPC), tablet PC, desktop computer, smart TV, digital camera, wrist watch, navigation system, and MP3 player. The wireless device can be a wireless device combining two or more functions of those devices.

Figure 1:
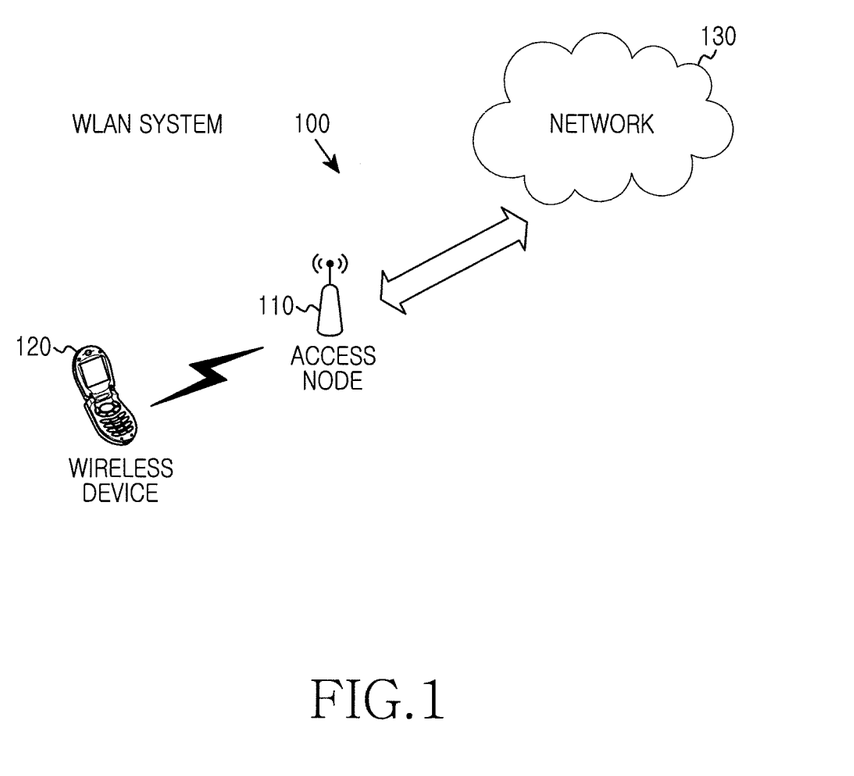
FIG. 1 illustrates a WLAN system according to an exemplary embodiment of the present disclosure.

FIG. 1 depicts a WLAN system according to an exemplary embodiment of the present disclosure.

As shown in FIG. 1, the WLAN system 100 includes an access node 110 and at least one wireless device 120.

The access node 110 is a node accessing a network 130 and providing the service to the wireless device 120. For example, the access node 110 can include an Access Point (AP), a host AP, a group owner for providing WLAN direct connection, and a base station. Herein, the host AP can indicate the access node 110 for providing the WLAN service to the wireless device 120 through tethering. The WLAN direct is a communication method for providing client nodes with a Peer to Peer (P2P) service over the LAN and can be referred to as a Wi-Fi Direct.

Using the channel bonding, the access node 110 communicates with the wireless device 120 using a plurality of non-overlapping channels. For example, when the WLAN system includes three non-overlapping channels, the access node 110 and the wireless device 120 can send and receive data using at least two of the three non-overlapping channels.

Now, a method for transmitting/retransmitting data using the channel bonding in a transmitting stage of the WLAN system is explained. Herein, the transmitting stage represents the access node 110 or the wireless device 120 of FIG. 1, which transmits the data.

Figure 2:
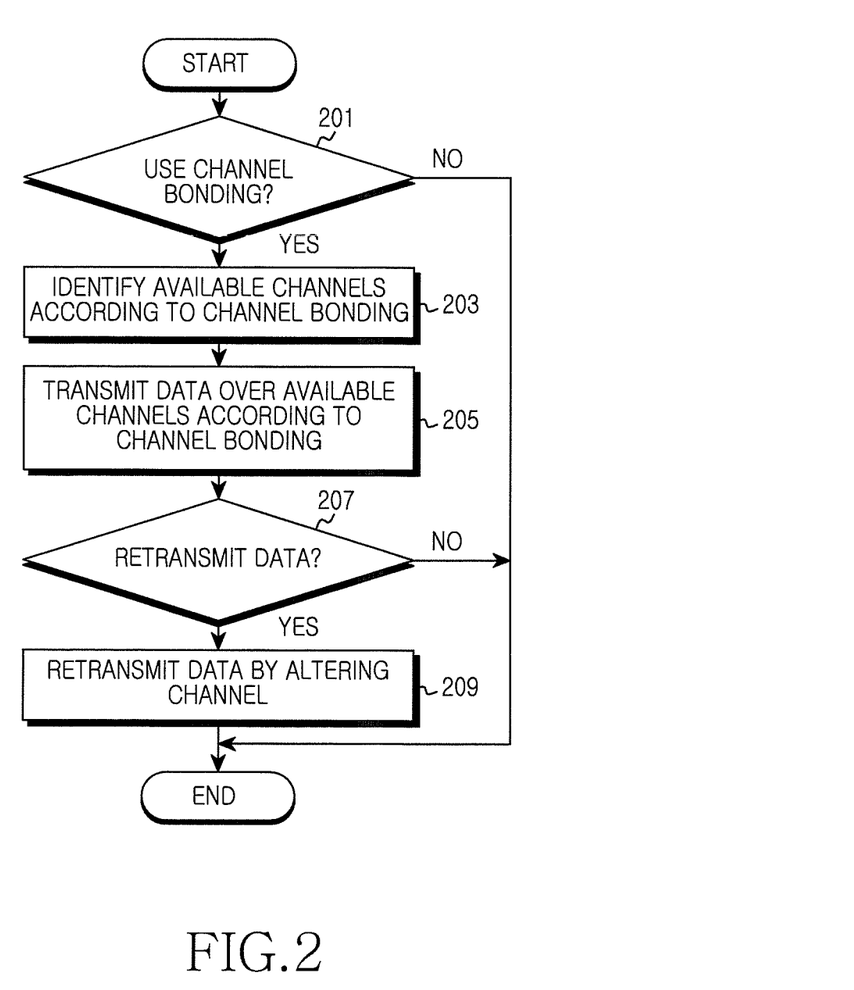
FIG. 2 illustrates a method for retransmitting data in a transmitting stage according to one exemplary embodiment of the present disclosure.

FIG. 2 illustrates a method for retransmitting data in the transmitting stage according to one exemplary embodiment of the present disclosure.

Referring to FIG. 2, the transmitting stage determines whether to use the channel bonding in step 201.

When not using the channel bonding, the transmitting stage finishes this process. In this case, the transmitting stage can transmit the data using any one of the multiple channels available for the WLAN service.

By contrast, when using the channel bonding, the transmitting stage identifies at least two channels available for the channel bonding in step 203. For example, the transmitting stage identifies at least two non-overlapping channels available for the channel bonding among the multiple channels for the WLAN service.

In step 205, the transmitting stage transmits the data over the channels available for the channel bonding.

In step 207, the transmitting stage determines whether to retransmit the data sent to the receiving stage. For example, the transmitting stage determines whether an Acknowledge (ACK)/Negative ACK (NACK) message of the data sent to the receiving stage in step 205 is received. When receiving the NACK message from the receiving stage, the transmitting stage determines to retransmit the data sent to the receiving stage.

When not retransmitting the data sent to the receiving stage, the transmitting stage finishes this process. In so doing, the transmitting stage can send next data over the channels available for the channel bonding in step 205.

By Contrast, when determining to retransmit the data sent to the receiving stage, the transmitting stage recognizes that a channel status of the data channel is unstable. The radio channel of the WLAN is quasi-static based on time. Accordingly, the transmitting stage recognizes that the channel for the data retransmission is unstable and thus determines high error probability in the retransmitted data when the data is retransmitted over the same channel.

Hence, the transmitting stage retransmits the corresponding data by changing the channel of the erroneous data in step 209. That is, the transmitting stage can determine the channel for the data retransmission using a different channel mapping scheme from a channel mapping scheme applied to the data transmission. For example, when two channels are used according to the channel bonding, the transmitting stage can retransmit the data by mapping first data which was transmitted over a first channel, to a second channel and mapping second data which was transmitted over a second channel, to the first channel. For example, when retransmitting only the first data which was transmitted over the first channel among the data sent over the two channels according to the channel bonding, the transmitting stage can map the first data to the second channel. In so doing, the transmitting stage can send new original data over the first channel.

Next, the transmitting stage finishes this process.

As such, when retransmitting the data by changing the channel, the transmitting stage sends channel change information of the data retransmission to the receiving stage. For example, the transmitting stage adds the channel change information to a header of a frame including the retransmitted data and sends the frame to the receiving stage. For example, the transmitting stage can send to the receiving stage a control signal including the channel change information of the retransmitted data.

In this exemplary embodiment, the transmitting stage retransmits the data by changing the channel.

Figure 3:
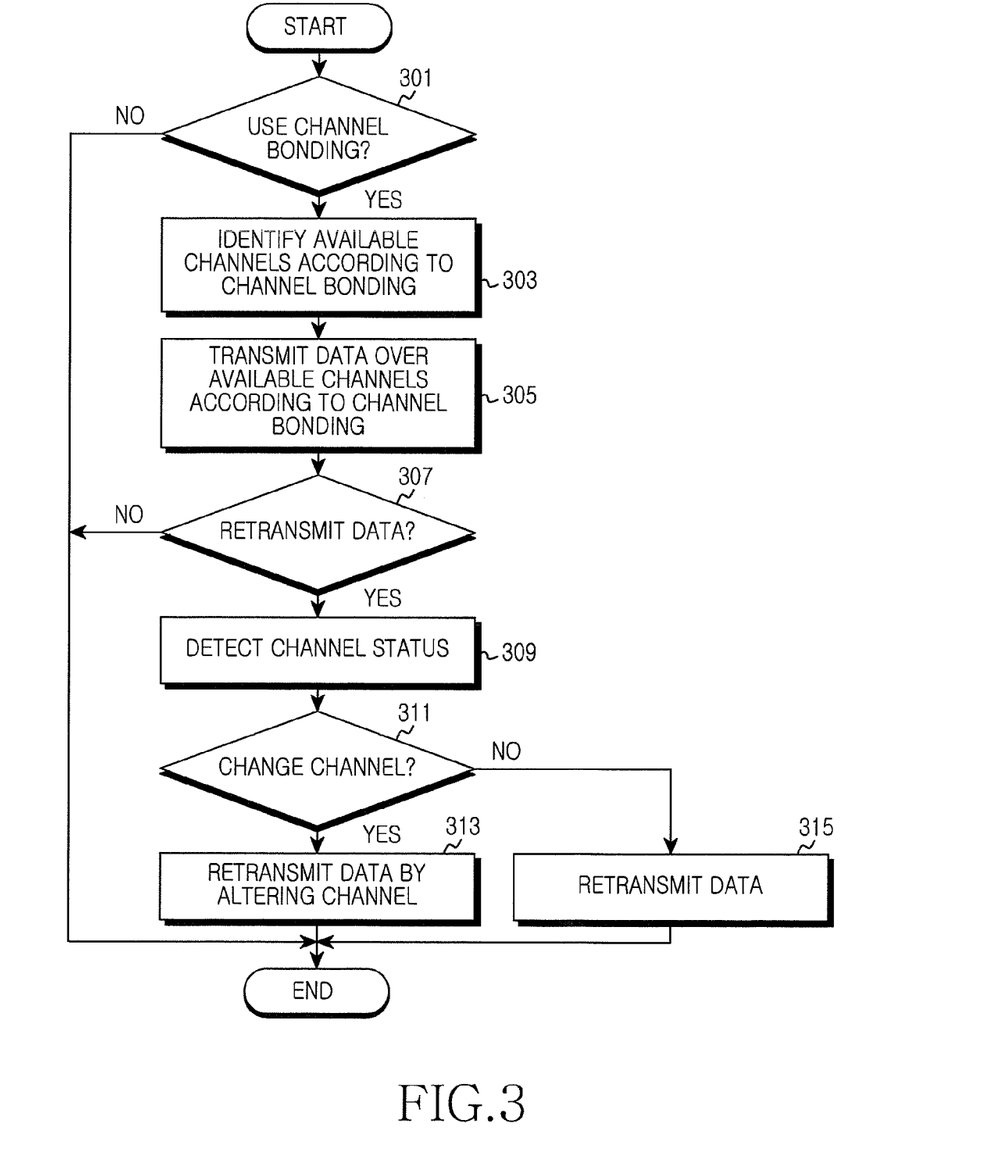
FIG. 3 illustrates a method for retransmitting the data in the transmitting stage according to another exemplary embodiment of the present disclosure.

Alternatively, the transmitting stage can selectively change the channel for the data retransmission by taking into account channel status information for the channel bonding as shown in FIG. 3.

FIG. 3 illustrates a method for retransmitting the data in the transmitting stage according to another exemplary embodiment of the present disclosure.

Referring to FIG. 3, the transmitting, stage determines whether to apply the channel bonding in step 301.

When not using the channel bonding, the transmitting stage finishes this process. In this case, the transmitting stage can transmit the data using any one of the multiple channels available for the WLAN service.

By contrast, when using the channel bonding, the transmitting stage identifies the channels available for the channel bonding in step 303. For example, the transmitting stage can identify at least two non-overlapping channels available for the channel bonding, among the multiple channels for the WLAN service.

In step 305, the transmitting stage transmits the data over the channels available for the channel bonding.

In step 307, the transmitting stage determines whether to retransmit the data sent to the receiving stage. For example, the transmitting stage determines whether the ACK/NACK message of the data sent to the receiving stage in step 305 is received. When receiving the NACK message, the transmitting stage can determine to retransmit the data sent to the receiving stage.

When not retransmitting the data sent to the receiving stage, the transmitting stage finishes this process. In so doing, the transmitting stage can send next data over the channels available for the channel bonding in step 305.

By contrast, when determining to retransmit the data sent to the receiving stage, the transmitting stage checks the status of the channels for the data retransmission in step 309. For example, the transmitting stage can check the status of the channels of the data transmitted in step 305.

In step 311, the transmitting stage determines whether to change the channel of the data retransmission by considering the status of the channels for the data retransmission. For example, the transmitting stage can determine whether to alter the retransmission channel by comparing a channel status value of the channels of the transmitted data with a reference value. When the channel status value of at least one of the channels of the transmitted data is smaller than the reference value, the transmitting stage can determine to alter the retransmission channel. That is, the transmitting stage can recognize the unstable channel of the transmitted data and high error probability in the retransmitted data over the same channel. Hence, the transmitting stage can determine to change the retransmission channel.

Upon determining to change the retransmission channel, the transmitting stage retransmits the data by changing the channel in step 313. That is, the transmitting stage can determine the channel for the data retransmission using a different channel mapping scheme from the channel mapping scheme applied to the data transmission. For example, when two channels are used according to the channel bonding, the transmitting stage can retransmit the data by mapping the first data which was transmitted over the first channel, to the second channel and mapping the second data which was transmitted over the second channel, to the first channel. For example, when retransmitting only the first data which was transmitted over the first channel among the data sent over the two channels according to the channel bonding, the transmitting stage can map the first data to the second channel. In so doing, the transmitting stage can send new original data over the first channel.

By contrast, when determining not to change the retransmission channel, the transmitting stage retransmits the data using the channel of the original data in step 315.

Next, the transmitting stage finishes this process.

As such, when recognizing the unstable channel status of the original data, the transmitting stage can retransmit the data by changing the retransmission channel. In so doing, the transmitting stage sends the channel change information of the data retransmission to the receiving stage. For example, the transmitting stage can add the channel change information to the header of the frame including the retransmitted data and send the frame to the receiving stage. For example, the transmitting stage can send to the receiving stage the control signal including the channel change information of the retransmitted data.

Figure 4:
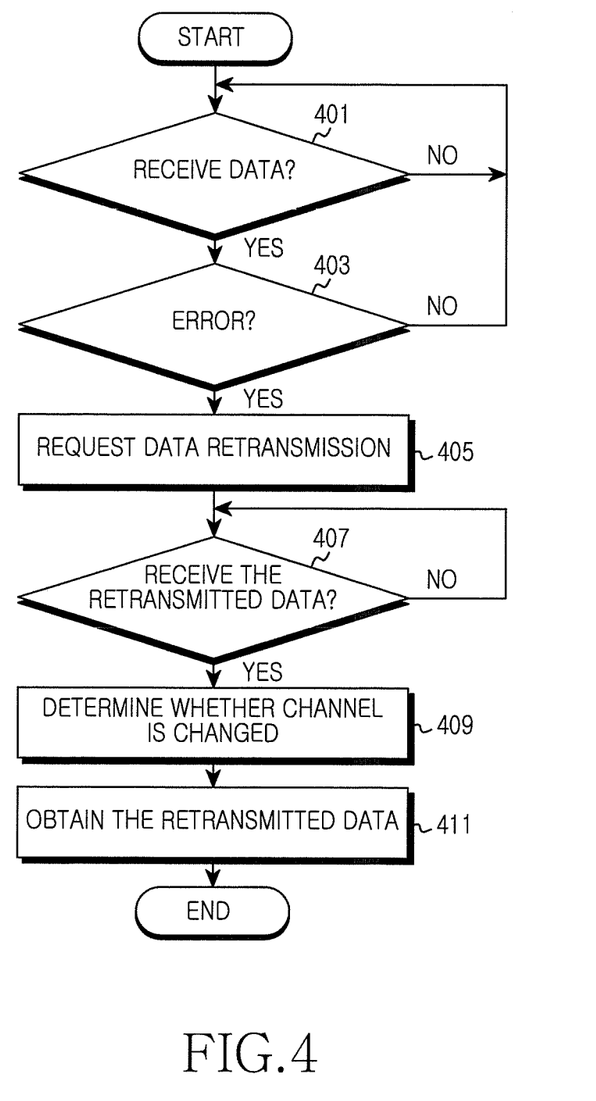
FIG. 4 illustrates a method for receiving the retransmitted data in a receiving stage according to an exemplary embodiment of the present disclosure.

FIG. 4 illustrates a method for receiving the retransmitted data in the receiving stage according to an exemplary embodiment of the present disclosure.

Referring now to FIG. 4, the receiving stage determines whether the data is received from the transmitting stage in step 401. For example, when the channel bonding is applied, the receiving stage can determine whether the data is received over the multiple channels available for the channel bonding.

Upon receiving the data from the transmitting stage, the receiving stage detects errors of the received data in step 403. For example, the receiving stage can detect the errors using Cyclic Redundancy Check (CRC) of the received data.

When the received data has no error, the receiving stage receives next data from the transmitting stage in step 401. In so doing, the receiving stage can send the ACK message to the transmitting stage.

By contrast, when the received data has errors, the receiving stage requests the transmitting stage to retransmit the received data in step 405. For example, the receiving stage can send the NACK message of the received data to the transmitting stage.

In step 407, the receiving stage determines whether the retransmitted data is received from the transmitting stage.

Upon receiving the retransmitted data, the receiving stage determines whether the channel is changed for the data retransmission in step 409. For example, the receiving stage can obtain the channel change information for the data retransmission from the header of the frame received from the transmitting stage. For example, the receiving stage can obtain the channel change information for the data retransmission from the control signal received from the transmitting stage.

In step 411, the receiving stage confirms the retransmitted data by considering the channel change information for the data retransmission.

Next, the receiving stage finishes this process.

Figure 5:
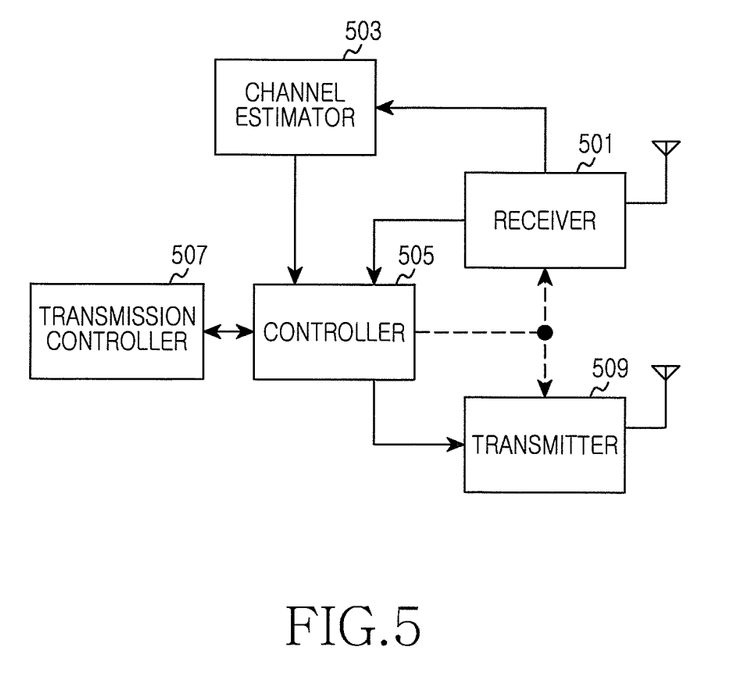
FIG. 5 illustrates the transmitting stage according to an exemplary embodiment of the present disclosure.

To transmit the data using the channel bonding, the transmitting stage can be constructed as shown in FIG. 5.

FIG. 5 is a block diagram of the transmitting stage according to an exemplary embodiment of the present disclosure.

As shown in FIG. 5, the transmitting stage can include a receiver 501, a channel estimator 503, a controller 505, a transmission controller 507, and a transmitter 509.

The receiver 501 converts a Radio Frequency (RF) signal received via a receive antenna to a baseband signal and demodulates the baseband signal. For example, the receiver 501 includes an RF processing block, a demodulating block, a channel decoding block, and a message processing block. The RF processing block converts the RF signal received over the channel for receiving the signal from the receiving stage via the receive antenna, to the baseband signal under control of the controller 505. The demodulating block includes a Fast Fourier Transform (FFT) operator for extracting data from subcarriers in the signal fed from the RF processing block. The channel decoding block includes a demodulator, a deinterleaver, and a channel decoder, and demodulates and decodes the signal output from the demodulating block. The message processing block detects the ACK/NACK message received from the receiving stage and provides the detected ACK/NACK message to the controller 505.

The channel estimator 503 estimates the channel status of each channel for sending and receiving the data to and from the receiving stage. Herein, the channel status includes a load and a Carrier to Interference and Noise Ratio (CINR) of the channel.

The controller 505 controls to transmit and receive the data to and from the receiving stage. For example, using the channel bonding, the controller 505 identifies at least two non-overlapping channels available for the channel bonding among the multiple channels available for the WLAN service. In this case, the controller 505 controls the receiver 501 and the transmitter 509 to send and receive the data over the channels of the channel bonding.

Under control of the transmission controller 507, the controller 505 controls to retransmit the data by altering the channel of the retransmitted data. That is, the controller 505 can determine the channel for the data retransmission using the channel mapping scheme different from the channel mapping scheme of the data transmission. For example, when two channels are used according to the channel bonding, the controller 505 can retransmit the data by mapping the first data which was transmitted over the first channel, to the second channel and mapping the second data which was transmitted over the second channel, to the first channel. For example, when retransmitting only the first data which was transmitted over the first channel among the data sent over the two channels according to the channel bonding, the controller 505 can map the first data to the second channel. In so doing, the controller 505 can send new original data over the first channel.

When changing the channel for the data retransmission, the controller 505 controls to send the channel change information for the data retransmission to the receiving stage. For example, the controller 505 can control to add the channel change information to the header of the frame including the retransmitted data and to send the frame to the receiving stage. For example, the controller 505 can control to add and send the retransmission channel change information to the receiving stage using a separate control message.

The transmission controller 507 determines whether to alter the channel for the data retransmission. For example, for the data retransmission, the transmission controller 507 can determine to alter the channel for the data retransmission as shown in FIG. 2. For example, for the data retransmission, the transmission controller 507 can determine whether to alter the channel for the data retransmission by considering the status of the data channels estimated by the channel estimator 503 as shown in FIG. 3.

The transmitter 509 encodes and converts the data and the control message destined for the receiving stage, to an RF signal and sends the RF signal to the receiving stage via a transmit antenna. For example, the transmitter 509 includes a message generating block, a channel encoding block, a modulating block, and a RF processing block. The message generating block generates the channel information for the data transmission or the channel information for the data retransmission. In so doing, the message generating block can generate the control message including the retransmission channel change information under the control of the controller 505. The channel encoding block includes a modulator, an interleaver, and a channel encoder, and encodes and modulates the transmit signal. The modulating block includes an Inverse FFT (IFFT) operator for mapping the signal fed from the channel encoding block to the subcarriers. The RF processing block converts the baseband signal output from the modulating block to the RF signal and transmits the RF signal to the receiving stage over the transmit antenna.

As constructed above, the controller 505 can function as the transmission controller 507. The components are separately provided to distinguish their functions. Accordingly, in an actual product, the controller 505 can process all or part of the functions of the transmission controller 507.

In this exemplary embodiment, the receiver 501 and the transmitter 509 of the transmitting stage send and receive the signal via the different antennas.

Alternatively, the receiver 501 and the transmitter 509 of the transmitting stage can send and receive the signal by sharing a single antenna.

Figure 6:
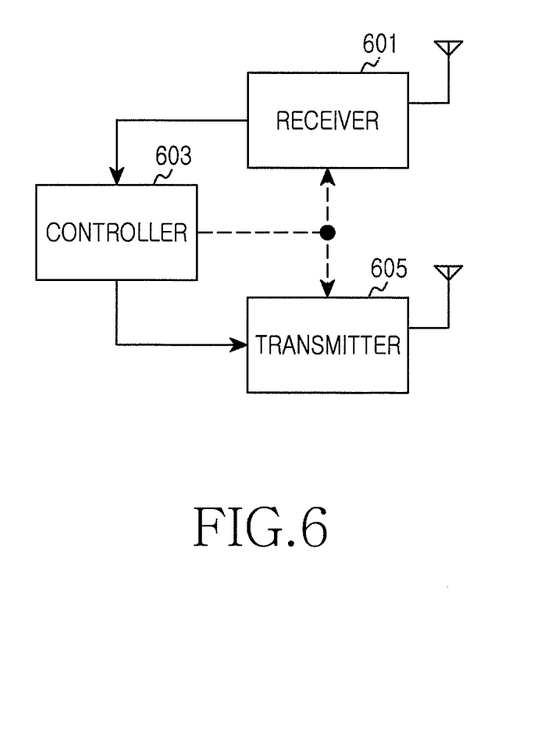
FIG. 6 illustrates the receiving stage according to an exemplary embodiment of the present disclosure.

FIG. 6 is a block diagram of the receiving stage according to an exemplary embodiment of the present disclosure.

As shown in FIG. 6, the receiving stage can include a receiver 601, a controller 603, and a transmitter 605.

The receiver 601 converts an RF signal received via a receive antenna to a baseband signal and demodulates the baseband signal. For example, the receiver 601 includes an RF processing block, a demodulating block, a channel decoding block, and a message processing block. The RF processing block converts the RF signal received over the channel for receiving the signal from the transmitting stage via the receive antenna, to the baseband signal under control of the controller 603. The demodulating block includes an FFT operator for extracting data from subcarriers in the signal fed from the RF processing block. The channel decoding block includes a demodulator, a deinterleaver, and a channel decoder, and demodulates and decodes the signal fed from the demodulating block. The message processing block detects the retransmission channel change information received from the transmitting stage and provides the detected information to the controller 603. For example, the message processing block obtains the retransmission channel change information from the header of the received data. For example, the message processing block can obtain the retransmission channel change information from the separate control message.

The controller 603 controls to transmit and receive the data to and from the transmitting stage. For example, using the channel bonding, the controller 603 identifies at least two non-overlapping channels available for the channel bonding among the multiple channels available for the WLAN service. In this case, the controller 603 controls the receiver 601 and the transmitter 605 to send and receive the data over the at least two non-overlapping channels available for the channel bonding. The controller 603 controls the receiver 601 and the transmitter 605 according to the retransmission channel change information output from the message processing block.

The controller 603 detects errors in the data received from the transmitting stage via the receiver 601. For example, the controller 603 detects the errors by considering the CRC of the data received from the transmitting stage.

The transmitter 605 encodes and converts the data and the control message destined for the transmitting stage, to an RF signal and sends the RF signal to the transmitting stage via a transmit antenna. For example, the transmitter 605 includes a message generating block, a channel encoding block, a modulating block, and an RF processing block. The message generating block generates the ACK/NACK message of the data received from the transmitting stage. The channel encoding block includes a modulator, an interleaver, and a channel encoder, and encodes and modulates the transmit signal. The modulating block includes an IFFT operator for mapping the signal fed from the channel encoding block to the subcarriers. The RF processing block converts the baseband signal output from the modulating block to the RF signal and transmits the RF signal to the transmitting stage over the transmit antenna.

In this exemplary embodiment, the receiver 601 and the transmitter 603 of the receiving stage can send and receive the signal via the different antennas.

Alternatively, the receiver 601 and the transmitter 603 of the receiving stage can send and receive the signal by sharing a single antenna.

As set forth above, the wireless communication system using the channel bonding retransmits the data over the different channel from the original data, and thus lowers the error probability of the retransmitted data caused by channel status deterioration and a hidden nose problem.

While the disclosure has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method to retransmit data in a wireless communication system using channel bonding, the method comprising:
   transmitting, by a wireless device, data by mapping a first set of data to a first channel of at least two channels according to the channel bonding and by mapping a second set of data to a second channel of the at least two channels according to the channel bonding;
   after transmitting the first set of data and the second set of data, determining by the wireless device, whether to change the at least two channels for the data retransmission based on a channel status of the at least two channels; and
   in response to determining to change the channel for the data retransmission, retransmitting, by the wireless device, the first set of data and the second set of data by changing a mapping scheme so that the first set of data is mapped to the second channel and the second set of data is mapped to the first channel,
   wherein retransmitting the data comprises transmitting channel change information by changing the channel change information corresponding to the changed channel in a header of the retransmitted data.

2. The method of claim 1, wherein the at least two channels comprise service coverages that do not overlap with each other of a plurality of channels in an entire service coverage of the wireless communication system.

3. The method of claim 1, wherein the channel status comprises at least one of a channel load and a Carrier to Interference and Noise Ratio (CINR).

4. The method of claim 1, further comprising:
   in response to determining not to change the channel for the retransmission of the first set of data and the second set of data, retransmitting the first set of data and the second set of data using a same mapping scheme as the mapping scheme used for the transmission of the first set of data and the second set of data.

5. The method of claim 1, wherein transmitting the channel change information comprises:
   transmitting the channel change information to a receiving stage by adding the channel change information for the retransmission of the first set of data and the second set of data to the header of the retransmitted data to a receiving stage.

6. The method of claim 5, wherein transmitting the channel change information to the receiving stage comprises:
   transmitting the channel change information for the retransmission of the first set of data and the second set of data to the receiving stage using a control message.

7. The method of claim 6, wherein transmitting the channel change information to the receiving stage comprises:
   encoding and converting the first set of data and the second set of data and the control message to an RF signal; and
   transmitting the RF signal to the receiving stage via a transmit antenna.

8. A wireless device comprising:
   a controller configured to:
      control a transmission of data by mapping a first set of data to a first channel of at least two channels according to a channel bonding and by mapping a second set of data to a second channel of the at least two channels according to the channel bonding,
      after transmitting the first set of data and the second set of data, determine whether to change the at least two channels for data retransmission based on a channel status of the at least two channels, and in response to determining to change the channel for the data retransmission, retransmit the first set of data and the second set of data by changing a mapping scheme so that the first set of data is mapped to the second channel and the second set of data is mapped to the first channel, wherein the controller is configured to control a transmission of channel change information by changing the channel change information corresponding to the changed channel in a header of the retransmitted first set of data and second set of data.

9. The wireless device of claim 8, wherein the at least two channels comprise service coverage do not overlap with each other of a plurality of channel in an entire service coverage of a wireless communication system.

10. The wireless device of claim 8, further comprising:
a channel estimator configured to check a status of the at least two channels used to transmit the first set of data and the second set of data.

11. The wireless device of claim 10, wherein the channel status comprises at least one of a channel load and a Carrier to Interference and Noise Ratio (CINR).

12. The wireless device of claim 10, wherein, in response to deter mining not to change the channel for the retransmission of the first set of data and the second set of data, the controller is configured to retransmit the first set of data and the second set of data using a same mapping scheme as the mapping scheme used for the transmission of the first set of data and the second set of data.

13. The wireless device of claim 10, wherein the controller is configured to control the transmission of the channel change infomation to a receiving stage by adding the channel change information for the retransmission of the first set of data and the second set of data to the header of the retransmitted data to a receiving stage.

14. The wireless device of claim 13, wherein the controller is configured to control the transmission of the channel change information for the retransmission of the first set of data and the second set of data to the receiving stage using a control message.

15. The wireless device of claim 14, wherein the controller is configured to control a transmitter to:
encode and convert the first set of data and the second set of data and the control message to an RF signal; and
send the RF signal via a transmit antenna.

16. The method of claim 1, wherein retransmitting the first set of data and the second set of data is based on a comparison between a channel status value of the channels transmitting the first set of data and the second set of data and a reference value.

17. The wireless device of claim 8, wherein the controller is configured to retransmit the first set of data and the second set of data based on a comparison between a channel status value of the channels transmitting the first set of data and the second set of data and a reference value.

18. A method to retransmit data in a wireless communication system using channel bonding, the method comprising:

transmitting, by a wireless device, data by mapping a first set of data to a first channel of at least two channels and by mapping a second set of data to a second channel of the at least two channels;

detecting, by the wireless device, retransmission data;

mapping, by the wireless device, channel for retransmission of the first set of data and the second set of data, wherein the channel for retransmission is mapped by crossing the respective channel used for transmission of the first set of data and the second set of data; and retransmitting, by the wireless device, at least one of the first set of data and the second set of data through the respective channel, wherein retransmitting the data comprises transmitting channel change information by changing the channel change information corresponding to the mapped channel in a header of the retransmitted data.

19. The method of claim 18, wherein retransmitting the data comprises:

determining retransmission of the first set of data which is transmitted through the first channel of the two channels; and transmitting data by mapping the first set of data to the second channel of at least two channels and by mapping new data to the first channel of the at least two channels.

20. A wireless device comprising:
a communication module; and
a processor connected functionally to the communication module,
the processor is configured to:
control to transmit data by mapping a first set of data to a first channel of at least two channels and by mapping a second set of data to a second channel of the at least two channels,
detect retransmission data,
map a channel for retransmission of the first set of data and the second set of data, wherein the channel for retransmission is mapped by crossing the respective channel used for transmission of the first set of data and the second set of data, and
retransmit at least one of the first set of data and the second set of data through the respective channel,
wherein the processor is further configured to control a transmission of channel change information by changing the channel change information corresponding to the mapped channel in a header of the retransmitted first set of data and second set of data.

21. The wireless device of claim 20, wherein the processor is configured to:
determine retransmission of the first set of data which is transmitted through the first channel of the two channels; and
control to transmit data by mapping the first set of data to the second channel of at least two channels and by mapping new data to the first channel of the at least two channels.

* * * * *